United States Patent [19]

Knollmueller

[11] Patent Number: 5,098,679

[45] Date of Patent: Mar. 24, 1992

[54] PURIFICATION OF ALKALI METAL HYDROSULFITE SOLUTIONS

[75] Inventor: Karl O. Knollmueller, Hamden, Conn.

[73] Assignee: Olin Corporation, Cheshire, Conn.

[21] Appl. No.: 731,572

[22] Filed: Jul. 17, 1991

Related U.S. Application Data

[63] Continuation-in-part of Ser. No. 632,257, Dec. 21, 1990, Pat. No. 5,034,202.

[51] Int. Cl.$^5$ .................................................. C01D 5/16
[52] U.S. Cl. ................................... 423/181; 423/629; 423/630; 423/512 A; 423/515; 423/517
[58] Field of Search .................................. 423/629, 630

[56] References Cited

U.S. PATENT DOCUMENTS

| | | | |
|---|---|---|---|
| 3,216,791 | 11/1965 | Hansley et al. | 423/100 |
| 3,523,069 | 8/1970 | Oloman | 204/92 |
| 3,961,034 | 6/1976 | Bostian et al. | 423/181 |
| 4,157,980 | 6/1979 | Tiethof | 252/188 |
| 4,590,058 | 5/1986 | Cawlfield | 423/515 |
| 5,034,202 | 7/1991 | Knollmueller | 423/512 A |

OTHER PUBLICATIONS

F. Foerster and E. T. Mommsen, Chem. Ber. 57, pp. 258–263 (1924) Chem. Abstracts 18, 1254 (1924).

*Primary Examiner*—Theodore Morris
*Assistant Examiner*—P. L. Hailey
*Attorney, Agent, or Firm*—James B. Haglind; Paul Weinstein

[57] ABSTRACT

A process for treating an alkali metal hydrosulfite solution which comprises contacting the alkali metal hydrosulfite solution with aluminum in a reaction mixture, and admixing carbon dioxide gas with the reaction mixture to remove dissolved aluminum as an aluminum-containing precipitate, the alkali metal hydrosulfite solution having a residual alkalinity of from about 0.1 to about 20 grams per liter of hydroxide ion.

20 Claims, No Drawings

PURIFICATION OF ALKALI METAL HYDROSULFITE SOLUTIONS

This application is a continuation-in-part application of U.S. Ser. No. 07/632,257, filed on Dec. 21, 1990, now U.S. Pat. No. 5,034,202.

BACKGROUND OF THE INVENTION

This invention relates to alkali metal hydrosulfite solutions. More specifically, this invention relates to alkali metal hydrosulfite solutions containing reduced amounts of undesirable impurities.

DESCRIPTION OF THE PRIOR ART

Alkali metal hydrosulfites are commercially available bleaching agents which are particularly suitable for use in the pulp, textile, and clay industries.

While available in the anhydrous form, alkali metal hydrosulfites (dithionites) are advantageously used as a solution. Solutions of sodium hydrosulfite are used commercially for the bleaching of thermo-mechanical pulp and recycled de-inked paper. This reductive bleaching with sodium hydrosulfite is preferred over oxidative bleaching processes using active oxygen or chlorine compounds. Bleaching with hydrogen peroxide as a source of active oxygen is more expensive and does not give superior increases in brightness. Pulp bleaching with chlorine or its derivatives requires a different chemical pretreatment and, because in using them environmentally objectionable halogenated organics are formed, these bleaching processes have come under increased scrutiny.

The reaction products formed in the reductive bleaching with hydrosulfites are much less objectionable, especially in continuous processes which recycle plant streams. All products present in effluents are ultimately converted to harmless sulfates by direct air oxidation or bacterial conversion processes.

Sodium hydrosulfite bleach solutions are produced by various processes, but all involve the reduction of sodium bisulfite solutions at pH levels around 6. In a specially designed electrolytic cell used in electrolytic processes, the reducing agents can be sodium amalgam or other selected metal cathodes. In chemical processes suitable reductants are sodium borohydride, zinc metal, or alkali metal formates. After the reduction step, the alkalinity of the product solution is adjusted upward to a pH above 9. This is commonly accomplished by the addition of between 1 and 6 grams/liter of an alkali metal hydroxide such as sodium hydroxide.

During the manufacture of hydrosulfite bleaches, sodium thiosulfate is one by-product formed. It is objectionable to the end users (paper mills) because, in bleaching processes currently used, it may cause corrosion of plant equipment.

In commerical processes used to produce sodium hydrosulfite solutions, the sodium thiosulfate level in the final product is between 2 and 10 grams/liter. The maximum currently acceptable sodium thiosulfate content by most paper mills is around 2 grams/liter in the solution delivered as product. This level can be partially achieved, for example, by crystallization of the sodium hydrosulfite as its dihydrate and redissolving the dihydrate in a hydrosulfite slip stream. However, this approach also leaves an effluent enriched in sodium thiosulfate for re-use or disposal.

A removal or destruction process for thiosulfate ions in sodium hydrosulfite solutions is therefore desirable to achieve acceptable sodium thiosulfate levels in hydrosulfite bleaches, levels which may be further reduced by, for example, the pulp and paper industry. One process which is available to destroy thiosulfate ions in sodium dithionite solutions. proceeds according to equation 1:

$$Na_2S_2O_3 + Na_2S_2O_4 + 4NaOH \rightarrow Na_2S + H_2O + 3Na_2SO_3 \qquad (1)$$

In this process, sodium dithionite is the reducing agent and high concentrations of alkali, up to 1 molar or greater, are used, and the alkali treatment should be carried at around $+30°$ C. for several hours. The disadvantage of this process is that there is still a large excess of alkali present in the hydrosulfite solution. This alkalinity may have to be reduced to optimize the product solution when used, for example, for pulp bleaching. Also, some additional decomposition of hydrosulfite by the alkali may take place and further reduce the hydrosulfite concentration, proceeding via Eq. 2.

$$3Na_2S_2O_4 + 6NaOH \rightarrow Na_2S + 5NaSO_3 + 3H_2O \qquad (2)$$

Reducing agents such as sodium borohydride reduce bisulfite to hydrosulfite, but do not act on the sulfite ion present in an alkaline medium. Under alkaline conditions where hydrosulfite is stable, most reducing agents leave thiosulfate unchanged.

BRIEF SUMMARY OF THE INVENTION

It has been found that thiosulfate ions can be destroyed in a process for treating an alkali metal hydrosulfite solution which comprises contacting the alkali metal hydrosulfite solution, having an alkalinity of from about 1 to about 20 grams per liter of hydroxide ion, with aluminum.

While this process is effective in removing thiosulfate, there is concern that minor or trace concentrations of aluminum present in the hydrosulfite solution might have adverse effects, for example, in pulp bleaching. It is believed that Al tends to react with chelating agents which are used to complex with heavy metals and improve brightness.

Thus there is a need to reduce aluminum concentrations in alkali metal hydrosulfite solutions to levels which will not interfere with achieving high levels of bleaching.

Now it has been found that the aluminum remaining in the hydrosulfite can be significantly reduced in a process which comprises treating an alkaline metal hydrosulfite solution containing aluminum as an impurity with carbon dioxide gas to form an insoluble aluminum precipitate.

DETAILED DESCRIPTION OF THE INVENTION

The novel process of the present invention employs as one reactant an aqueous solution of an alkali metal hydrosulfite. Suitable alkali metal hydrosulfites include sodium hydrosulfite, potassium hydrosulfite, lithium hydrosulfite, and mixtures thereof. For the sake of simplicity, the process of the invention will be described using sodium hydrosulfite as the alkali metal hydrosulfite. As commercial products, sodium hydrosulfite solutions treated by the process of the invention contain from about 80 to about 160 grams per liter of sodium hydrosulfite. A residual alkalinity of from about 0.1 to about 20, preferably from about 4 to 12, and more preferably from about 6 to about 8 grams per liter as hydroxide ion is initially present in the sodium hydrosulfite solution. The residual alkalinity stabilizes the solution and provides reserves for neutralization of hydrogen sulfite and bisulfite which may be formed. The source of residual alkalinity is, for example, an alkali metal hydroxide, an alkaline earth metal hydroxide or mixtures thereof. Preferably the residual alkalinity is supplied by an alkali metal hydroxide, such as sodium hydroxide, potassium hydroxide, lithium hydroxide, and mixtures thereof, with sodium hydroxide being more preferred. The residual alkalinity can be determined, for example, by admixing 1 ml. of the hydrosulfite solution in 100 mls. of de-aerated water and titrating the solution with hydrochloric acid to a pH of 9.2.

To reduce the thiosulfate concentration of these solutions, they are contacted with aluminum which is preferably employed in metal form. Decomposition of thiosulfate ions is believed to be represented by the overall reaction shown by Equation 3:

$$2Al + 3Na_2S_2O_3 + 6NaOH + 3H_2O \rightarrow 3Na_2SO_3 + 3Na_2S + Al(OH)_3 \quad (3)$$

As long as the alkalinity of the hydrosulfite solution is above about 2 grams per liter, the hydrosulfite solution is clear. At higher alkalinities formation of sodium aluminates may occur in a reaction believed to be represented by Equation 4:

$$Al(OH)_3 + (3-x)NaOH \rightleftharpoons Na_{(3-x)}Al(OH)_{(6-x)} \quad (4)$$

wherein x=0,1 or 2.

If the thiosulfate ion concentration is depleted, an undesirable side reaction which decomposes hydrosulfite ions may compete. This decomposition reaction is believed to proceed according to Eq. 2 above, or involve a reductive step illustrated by Eq. 5:

$$4Al + 3Na_2S_2O_4 + 6NaOH + 3H_2O \rightarrow 3Na_2S + 3Na_2SO_3 + 4Al(OH)_3 \quad (5)$$

This decomposition takes place slowly so that the hydrosulfite concentration is not reduced to levels which would impair applications of the product solution.

Surprisingly, the process of the invention takes place at low temperatures i.e., those which are normally used for storage of the sodium hydrosulfite solution to minimize thermal decomposition. Suitable reaction temperatures include those in the range of from about $-10°$ to about $25°$ C., preferably at from about $-5°$ to about $+5°$ C., and more preferably at from about $-2°$ to about $+2°$ C.

It has been found that the reaction of Al with thiosulfate ion is a 0 order reaction in which the reaction rates are directly dependent on the surface area. Any form of aluminum may be used such as granular aluminum, aluminum dust or powder or aluminum foil. A preferred form of the metal is granular aluminum. It is desirable to minimize the presence of aluminum oxide as it delays the initial reaction time. The oxide is removed by the alkalinity present in the hydrosulfite solution.

In a preferred embodiment, the sulfide ions formed by the decomposition of thiosulfate ions are removed from the hydrosulfite product solution. This can be readily accomplished, for example, by the addition of a metal salt capable of forming an insoluble sulfide. Salts of zinc, lead or iron are suitable with the sulfate being preferred, however, oxides, hydroxides and carbonates can also be used although the reaction time is increased. Using a sulfate as the reactant, the sulfide removal reaction is believed to be illustrated by the following equation:

$$MSO_4 + Na_2S \rightarrow MS + Na_2SO_4 \quad (6)$$

where M represents a bivalent metal ion.

While thiosulfate ion removal from alkali metal hydrosulfite solutions has been described using aluminum, it will be understood that gallium and indium can also be employed.

During the thiosulfate ion removal reaction some aluminum dissolves and remains soluble in form of alkali metal aluminates. Thus following thiosulfate reduction trace amounts of aluminum remain dissolved in the hydrosulfite solution. Al concentrations found can be in the range of from about 0.1 to about 1% by weight, and more normally from about 0.15 to about 0.35% by weight of aluminum. For example, as expressed in equation (4) above, sodium aluminate is in equilibrium with aluminum hydroxide and sodium hydroxide. With excess sodium hydroxide the equilibrium is shifted to the right and soluble aluminates form.

In the novel process of the invention, carbon dioxide gas is admixed with the hydrosulfite solution to remove the aluminum by the formation of an insoluble precipitate. While not wishing to be bound by theory, it is believed that carbon dioxide in water forms, in an equilibrium, carbonic acid which neutralizes free alkalinity to carbonate and bicarbonate:

$$CO_2 + H_2O \rightarrow H_2CO_3 \quad (7)$$

Carbon dioxide may also react with sodium hydroxide to form carbonates and bicarbonates according to the following equations;

$$H_2CO_3 + 2NaOH \rightarrow Na_2CO_3 + 2H_2O \quad (8)$$

and $$H_2CO_3 + NaOH \rightarrow NaHCO_3 + H_2O \quad (9)$$

During the treatment with carbon dioxide gas, free alkalinity is removed and the aluminate ion becomes unstable, resulting in the quantitative precipitation of aluminum. The amount of carbon dioxide gas admixed with the sodium hydrosulfite solution is not critical, as the presence of carbonate ion in the hydrosulfite solution is known to have a stabilizing effect.

However it is desireable to control the reduction in alkalinity while carbon dioxide gas is being admixed with the hydrosulfite solution. In a preferred embodiment, the alkalinity in the hydrosulfite solution should be sufficient to provide a pH of about 8.5 or higher, for example, a pH in the range of from about 8.5 to about 9.5, and preferably in the range of from about 9 to about 9.4.

It has been found that the removal of the insoluble sulfide and the aluminum precipitate can be carried out in a single separation. In this mode of the process, it is preferred to add the metal which forms an insoluble metal sulfide first and at the end of the sulfide removal step, admix carbon dioxide gas to remove dissolved aluminum from the solution. The insoluble precipitates are removed by any suitable solid-liquid separation method, such as filtration or centrifugation. Following the removal of the solid precipitates, the hydrosulfite solution is stabilized by the addition of an alkaline metal hydroxide such as sodium hydroxide.

The process of the present invention is further illustrated by the following examples, with no intention of being limited thereby. All parts and percentages are by weight unless otherwise indicated.

EXAMPLE 1-3

To each of 3 bottles containing a magnetic stir bar was added 100 mls. of a sodium hydrosulfite solution. The composition of each solution is given in Table I below. Powdered aluminum was added to each bottle and the bottles sealed and placed into a jacketed beaker placed on a magnetic stirrer. Through the jacketed beaker a glycol-water mixture was circulated to maintain the temperature of the reaction mixture at around 0° C. During the initial stages of the reaction, there was some hydrogen evolution which is indicative of the dissolution reaction of aluminum in the alkali solution. The pressure buildup in the sealed bottles during the reaction period was slight. The reaction was allowed to proceed for 12 hours. A sample of each sodium hydrosulfite solution was taken for analysis employing a nitrogen atmosphere during the removal and handling to prevent oxidation of the hydrosulfite by air. Sulfide ion concentrations and thiosulfate concentrations in the solutions were determined by ion chromotography. The results are recorded in Table I below. Following the determination of the sulfide concentrations, the solutions were treated with a metal salt in an amount corresponding to the sulfide concentration to remove the sulfide formed as a precipitate. To the solution of Example 1, zinc sulfate was added; zinc carbonate was added to the solution of Example 2; and lead sulfate was added to the solution of Example 3.

EXAMPLES 4-6

The method of Examples 1-3 was repeated exactly using 0.4 grams of aluminum foil (surface area: 482 cm$^2$/g)) as the reactant and lead sulfate as the precipitant for sulfide. The results are recorded in Table I below.

EXAMPLES 7-8

The method of Examples 1-3 was employed using 0.5 grams of aluminum foil as the reactant, a reaction period of 5 hours, and lead sulfate as the precipitant for sulfide ions. The sulfide ion concentration in the treated hydrosulfite solutions was not determined. The results recorded in Table 1 below.

Examples 1-8 show that the process of the invention results in significant reduction in sodium thiosulfate concentrations in concentrated sodium hydrosulfite solutions.

TABLE I

| Example Number | Na Dithionite grams/liter before | Na Thiosulfate grams/liter before react. | Na Hydroxide grams/liter before react. | Aluminum grams | Na Thiosulfate grams/liter after react. | Na Sulfide grams/liter after react. | Na Dithionite grams/liter after workup | Precipitant |
| --- | --- | --- | --- | --- | --- | --- | --- | --- |
| 1 | 127.00 | 12.25 | 9.05 | Powder .8 g | 1.16 | 14.67 | 112.00 | ZnSO4.7H2O |
| 2 | 126.80 | 12.10 | 14.09 | Powder .7 g | 2.60 | 6.14 | 114.98 | ZnCO3 |
| 3 | 126.80 | 12.60 | 14.09 | Powder .4 g | 1.13 | 10.92 | 110.41 | PbSO4 |
| 4 | 130.00 | 2.41 | 10.40 | Foil .4 g | 0.20 | 6.04 | 117.60 | PbSO4 |
| 5 | 117.00 | 8.30 | 10.06 | Foil .4 g | 3.50 | 5.80 | 108.00 | PbSO4 |
| 6 | 117.00 | 8.30 | 10.06 | Foil .4 g | 2.10 | 6.54 | 105.00 | PbSO4 |
| 7 | 130.79 | 9.46 | 9.53 | Foil .5 g | 1.80 | not done | 112.49 | PbSO4 |
| 8 | 131.25 | 4.09 | 9.00 | Foil .5 g | 0.00 | not done | 111.70 | PbSO4 |

EXAMPLE 9

The method of Examples 1-3 was repeated using 100 mls. of sodium hydrosulfite having an alkalinity residual of ca 9 g/l and 0.3 g. of aluminum foil with two exceptions. The first exception being that the analysis of the solution for thiosulfate ions and sulfide ions was carried out each hour during the reaction period. The second exception to the method was the omission of the addition of a metal salt as a precipitant. The results are reported in Table II below:

TABLE II

| Time Minutes | GPL $Na_2S_2O_4$ present | GPL $Na_2S_2O_3$ present | GPL $Na_2SO_3$ present | GPL $Na_2S$ present |
| --- | --- | --- | --- | --- |
| 0 | 131.32 | 7.43 | 73.60 | 0.46 |
| 60 | 124.84 | 6.97 | 69.40 | 2.04 |
| 120 | 127.05 | 6.27 | 79.43 | 6.04 |
| 180 | 126.80 | 3.93 | 87.39 | 8.06 |
| 240 | 127.43 | 3.12 | 97.68 | 14.29 |

EXAMPLE 10

The method of Example 9 was repeated exactly with the exception that 1 g. of powered aluminum was used as the reactant. Table III below reports the results obtained:

TABLE III

| Time Minutes | GPL $Na_2S_2O_4$ present | GPL $Na_2S_2O_3$ present | GPL $Na_2SO_3$ present | GPL $Na_2S$ present |
| --- | --- | --- | --- | --- |
| 0 | 131.32 | 7.43 | 73.00 | 0.46 |
| 60 | 127.5 | 4.37 | 84.31 | 6.79 |
| 120 | 122.78 | 1.93 | 94.33 | 11.56 |
| 180 | 126.45 | 1.41 | 101.01 | 14.56 |
| 240 | 120.77 | 0.01 | 108.99 | 18.4 |

EXAMPLE 11

A sodium hydrosulfite solution containing thiosulfate ions as an impurity was treated with aluminum metal to reduce thiosulfate ions to sulfide ions.

The addition of zinc sulfate heptahydrate removed the sulfide ions by the formation of insoluble zinc sulfide. Following the separation of the zinc sulfide, the solution was analyzed and found to contain 111 grams per liter of sodium hydrosulfite and 5.1 grams per liter of alkalinity as NaOH. The hydrosulfite solution also contained less than 10 parts per million of zinc ion and 0.2 percent by weight of aluminum.

The hydrosulfite solution container was placed in a glove box having a nitrogen atmosphere. The solution was cooled to 0° C. and carbon dioxide was bubbled into the stirred solution. A gelatinous precipitate of alumina hydroxide separated from the solution. At periodic intervals, 1 ml samples were withdrawn and diluted in oxygen-free water containing a few drops of phenolphthalein/thymolphthalein indicator mixture. The solution was then titrated with standard acid from purple to a light red color. When the measured alkalinity was 2.5 grams per liter, the solution was filtered to remove aluminum hydroxide. Following filtration, the hydrosulfite solution contained 103 grams per liter of sodium hydrosulfite and 2.9 grams per liter of NaOH, with an aluminum content of 245 parts per million.

EXAMPLE 12

A sodium hydrosulfite solution which had been treated with aluminum to remove thiosulfate ions contained 120 grams per liter of sodium hydrosulfite, 2.2 grams per liter of sodium hydroxide and 0.23 percent by weight of Al. Using the method of Example 11, carbon dioxide was introduced until samples diluted with air-free water developed no color with phenolphthalein.

The aluminum hydroxide precipitate was filtered off and sodium hydroxide added to the filtrate. The treated sodium hydrosufite solution assayed 113 grams per liter of $Na_2S_2O_4$, 3.8 grams per liter of sodium hydroxide, with an aluminum content of less than 10 parts per million (the detection level of the analytical procedure).

EXAMPLE 13

A container having 235.6 grams of a commercial electrochemically produced sodium hydrosulfite solution was placed in the glove box. The solution contained 135.3 g/l sodium hydrosulfite, 10.22 g/l sodium thiosulfate and 8.2 g/l sodium hydroxide. The solution was cooled to 0° C. and treated with 0.5 grams of aluminum foil. During the treatment, the alkalinity was measured periodically and maintained at about 4 g/l by additions of a 50% sodium hydroxide solution. During the reaction, periodic analyses of the alkalinity level concentrations and the thiosulfate concentrations were made. After 3 hours, the thiosulfate level had dropped to less than 0.4 grams per liter and the sulfide ion concentration was 6.67 grams per liter. $ZnSO_4.7H_2O$ (5.4 g) was added and the alkalinity monitored as above. By addition of sodium hydroxide, it was maintained between 1 and 2 grams per liter NaOH. After 1 hour, ion chromatographic analysis indicated the absence of sulfide ion. Carbon dioxide was then bubbled into the solution. During carbon dioxide addition, the pH of the solution was frequently determined, using phenolphthalein as the indicator. $CO_2$ addition was continued until the color developed in the pH determination was barely pink, indicating a pH of around 9. The mixture of zinc sulfide and aluminum hydroxide was filtered. For stabilization sodium hydroxide was added to the filtrate. The product assayed 125.3 grams per liter sodium hydrosulfite and 4.9 grams per liter of sodium hydroxide. The concentration of zinc and aluminum ions in the hydrosulfite solution were each < 10 parts-per-million (the detection limit).

What is claimed is:

1. A process for treating an alkali metal hydrosulfite solution which comprises contacting the alkali metal hydrosulfite solution with aluminum in a reaction mixture in a sealed system in the absence of air, and admixing carbon dioxide gas with the reaction mixture to remove dissolved aluminum as an aluminum-containing precipitate, the alkali metal hydrosulfite solution having a residual alkalinity of from about 0.1 to about 20 grams per liter of hydroxide ion.

2. The process of claim 1 in which the alkali metal hydrosulfite is selected from the group consisting of sodium hydrosulfite, potassium hydrosulfite, lithium hydrosulfite, and mixtures thereof.

3. The process of claim 2 in which the alkali metal hydrosulfite solution is at a temperature in the range of from about −10° to about +25° C.

4. The process of claim 1 in which the alkali metal hydrosulfite solution contains thiosulfate ion in a concentration of at least about 1 gram per liter.

5. The process of claim 1 in which the source of hydroxide ion is an alkali metal hydroxide, an alkaline earth metal hydroxide or mixtures thereof.

6. The process of claim 5 in which the source of hydroxide ion is an alkali metal hydroxide selected from the group consisting of sodium hydroxide, potassium hydroxide, lithium hydroxide, and mixtures thereof.

7. The process of claim 6 in which the alkali metal hydrosulfite solution is sodium hydrosulfite.

8. The process of claim 7 in which the source of hydroxide ion is sodium hydroxide.

9. The process of claim 8 in which the alkali metal hydrosulfite solution has a residual alkalinity of from about 4 to about 12 grams per liter of hydroxide ion.

10. A process for removing thiosulfate ions from an aqueous solution of alkali metal hydrosulfite which comprises:
    a) treating the alkali metal hydrosulfite solution with aluminum in a reaction mixture in a sealed system in the absence of air to convert the thiosulfate ions to sulfide ions,
    b) reacting the sulfide ions in the reaction mixture with a metal salt to form an insoluble metal sulfide,
    c) treating the reaction mixture with carbon dioxide gas to react with dissolved aluminum to form an aluminum-containing precipitate, and,
    d) separating the insoluble metal sulfide and the aluminum-containing precipitate from the aqueous solution of alkali metal hydrosulfite, the aqueous solution of alkali metal hydrosulfite having a residual alkalinity of from about 0.1 to about 20 grams per liter of hydroxide ion.

11. The process of claim 10 in which the alkali metal hydrosulfite is selected from the group consisting of sodium hydrosulfite, potassium hydrosulfite, lithium hydrosulfite, and mixtures thereof.

12. The process of claim 11 accomplished by maintaining the reaction mixture at a temperature in the range of from about −10° to about +25° C.

13. The process of claim 10 in which the alkali metal hydrosulfite solution has an initial thiosulfate ion concentration of at least about 1 gram per liter.

14. The process of claim 10 in which the source of hydroxide ion is an alkali metal hydroxide, an alkaline earth metal hydroxide or mixtures thereof.

15. The process of claim 14 in which the source of hydroxide ion is an alkali metal hydroxide selected from the group consisting of sodium hydroxide, potassium hydroxide, lithium hydroxide, and mixtures thereof.

16. The process of claim 10 in which the metal salt is of a metal selected from the group consisting of zinc, lead, ferrous iron, and mixtures thereof.

17. The process of claim 16 in which the metal salt is a metal sulfate.

18. The process of claim 11 in which the alkali metal hydrosulfite solution is sodium hydrosulfite.

19. The process of claim 18 in which the source of hydroxide ion is sodium hydroxide.

20. A process for purifying alkali metal hydrosulfite solutions which comprises treating an alkaline alkali metal hydrosulfite solution in a sealed system in the absence of air containing aluminum as an impurity with carbon dioxide gas to form an aluminum-containing precipitate.

* * * * *